Patent [19] 3,899,749
Hill et al. [45] Aug. 12, 1975

[54] GAS DYNAMIC LASERS

[75] Inventors: Roland John Hill, Quarndon; Norman Thomas Jewell, Mickleover, both of England

[73] Assignee: Rolls-Royce Limited, London, England

[22] Filed: July 18, 1972

[21] Appl. No.: 272,842

[30] Foreign Application Priority Data
July 20, 1971 United Kingdom............... 33872/71

[52] U.S. Cl. ............................. 331/94.5 P; 330/4.3
[51] Int. Cl. ........................... H01s 3/09; H01s 3/22
[58] Field of Search ..................... 331/94.5; 330/4.3

[56] References Cited
OTHER PUBLICATIONS
Gerry, IEBB Spectrum, Nov. 1970, pp. 51–58.
Meinzer, AIAA Paper No. 71–75, 9th Aerospace Sciences Meeting, Jan. 25–27, 1971, pp. 1–8.

*Primary Examiner*—Ronald L. Wibert
*Assistant Examiner*—R. J. Webster
*Attorney, Agent, or Firm*—Cushman, Darby & Cushman

[57] ABSTRACT

In a high powered laser system it is proposed that combustion gases be bled off from a gas turbine engine and their composition adjusted by burning extra fuel in the bleed gases or adding extra substances. Suitable aerodynamic expansion produces a population inversion resulting in laser action in the $CO_2$ species.

Alternatively, bleed gases may be taken from the high pressure compressor of the gas turbine engine and an appropriate fuel burnt therein. If required, other adjustments may also be made to the composition and the resulting gaseous mixture subjected to aerodynamic expansion to induce laser action as before.

30 Claims, 5 Drawing Figures

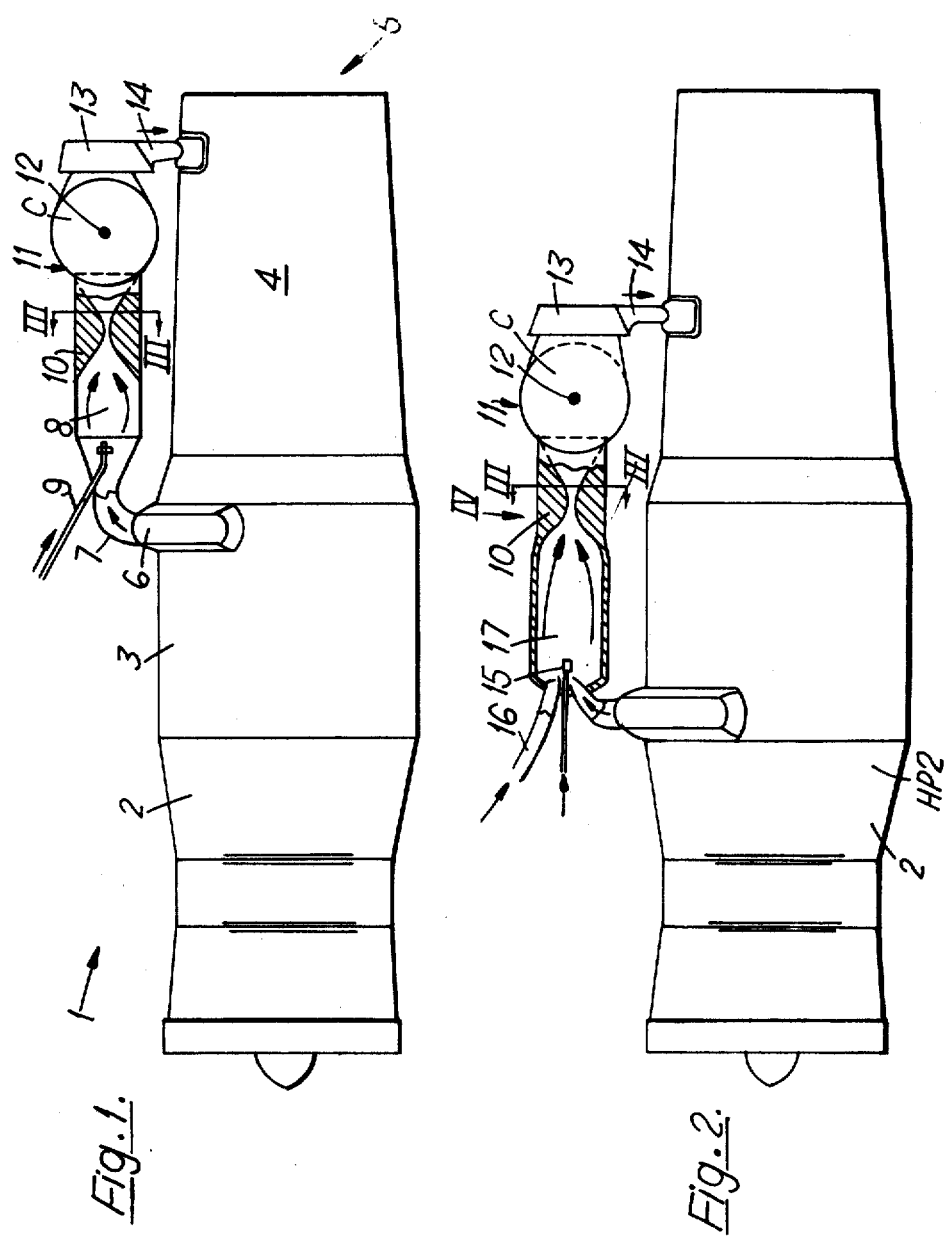

Exhaust

GAS DYNAMIC LASERS

This invention relates to methods of producing coherent beams of electromagnetic radiation by means of inducing laser action in a gaseous medium. In particular, it relates to the use of equipment supporting continuous combustion, such as gas turbine engines, to produce a laser beam.

Certain gases may be used as lasing mediums in a variety of ways, for example:

they may be electrically excited in either flow or non-flow modes; chemical reactions leading to laser action may be produced in suitably mixture of gases;

they may be thermally or optically pumped;

rapid cooling produced by aerodynamic expansion may be utilised, and; the mixing of non-equilibrium gas flows is another known technique.

The above list does not exhaust the possibilities.

The object of all processes designed to promote lasing is to produce a population inversion of the molecules comprising the lasing medium, which in the present case is gaseous.

In its broadest aspect therefore, the present invention may be defined as a method of producing a laser beam comprising bleeding off gases from apparatus supporting continuous combustion, injecting into the bleed gases at least one additional substance to produce a mixture of gases having a composition suitable for the support of laser action therein, producing a population inversion in at least one of the constituents of said gaseous mixture, and utilising laser radiation resulting therefrom to produce a laser beam.

Preferably the continuous combustion apparatus is a gas turbine engine, which may burn such fuels as are normally provided for such an engine.

According to one aspect of the invention, bleed gases are drawn from the compressor section of the gas turbine engine.

According to another aspect of the invention bleed gases are combustion gases from the gas turbine engine.

Preferably, said additional substances injected into the bleed gases are selected from the group comprising cyanogen, carbon disulphide, nitrogen, carbon dioxide, carbon monoxide, air, finely divided carbon and hydrocarbon fuels.

Preferably, said population inversion is produced by means of aerodynamic expansion of said gaseous mixture.

Preferably, an optically resonant cavity is used to produce a laser beam from laser radiation resulting from the population inversion.

Also according to the invention there is provided apparatus to perform the method of the invention.

It will be realised that in order to support laser action, particular gaseous lasing media must have compositions which do not depart from certain limits and constituents. In the present case the lasing species of gas is carbon dioxide, some of which may be derived from the bleed gases of the gas turbine engine, but since the carbon dioxide molecule has 3 vibrational degrees of freedom, a more efficient means of using the available thermal energy of the system is to mix the carbon dioxide with an appropriate proportion of a gas such as $N_2$. The $N_2$ has a single vibrational degree of freedom, whose energy levels allow resonant vibrational energy exchange with the upper laser energy level. Furthermore, the relaxation time of homopolar molecules such as $N_2$ are long and result in the $N_2$ acting as an energy pump for the upper laser level in $CO_2$. Again, in the present case, the necessary nitrogen can be provided by the gas turbine engine.

Although the two gases just mentioned are necessary to the working of the present invention they are insufficient to produce a high power laser system; small quantities of other substances, called "relaxing agents," must be present so as to promote rapid and selective de-excitation of the lower energy levels of the lasing species. Examples of such relaxing agents are water vapour and sulphur dioxide. In larger quantities relaxing agents and other substances such as oxygen or carbon monoxide reduce laser action.

The above consideration show the need to adjust the composition of gas turbine engine bleed gases by injection of further substances into the gas stream.

Two specific embodiments of the present invention will now be described with reference to the accompanying drawings, though it will be realised that the invention is not limited to these embodiments.

In the accompanying drawings (which are not to scale):

FIG. 1 diagrammatically shows a part-sectional view of the first embodiment in which the bleed gases are taken from the combustion chamber or chambers of a gas turbine engine.

FIG. 2 diagrammatically shows a part-sectional view of the second embodiment in which the bleed gases are taken from the compressor of a gas turbine engine.

Figure 3:
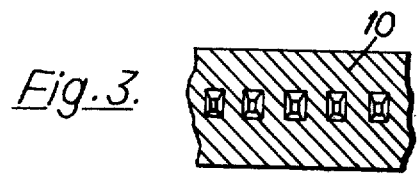
FIG. 3 shows a cross section taken on lines III—III in FIGS. 1 and 2.

Referring to FIG. 1, reference numeral 1 indicates a gas turbine engine of the type used to power aircraft, for example, fighter-aircraft. The engine comprises a compressor section 2, combustion equipment 3 and turbine section 4 leading to exhaust duct and nozzle 5. Combustion gases are bled off from the combustion chamber or chambers at 6 and passed by means of a suitable duct 7 to a reservoir/combustion chamber 8, the purpose of which is to smooth out pressure fluctuations and allow mixing and/or combustion of the bleed gases with other substances, such as a fuel, which are injected at 9 or at other points (not shown) into the stream of bleed gases.

The reservoir must obviously be built to withstand the heat of the bleed gases. In addition, if non-inert substances are to be injected, as must be the case if bleed gas temperature is too low or if the composition of the mixture cannot be adjusted adequately without the addition of such substances, then the reservoir must be designed as a combustion chamber also. This is in fact the case in the present embodiment.

Typical combustion products of a modern gas turbine engine such as would be used to carry out the present invention are of a composition which is approximately as shown in Table I. The composition which is required for the support of laser action after aerodynamic expansion is also shown, as well as the status of the various constituents as regards the support of laser action in the mixture.

TABLE I

| CONSTITUENT | STATUS | AS TYPICAL MOLAR % OF COMBUSTION GASES | AS MOLAR % OF A MIXING REQUIRED TO SUPPORT LASER ACTION |
|---|---|---|---|
| $N_2$ | Energy pump | 76.99 | 70 – 90% |
| $CO_2$ | Lasing species | 2.79 | 5 – 25% |
| $H_2O$ | | 2.75 | up to 20% $H_2O$ acceptable* |
| $SO_2$ | Relaxing agents | <0.1 | |
| Ar | | 0.9 | |
| CO | Additional gases which could cause additional losses. | <0.1 | |
| $O_2$ | | 16.5 | Will reduce laser action |

*this figure given subject to the expansion nozzle providing a suitable rate and degree of expansion; the higher the water content, the higher the rate of expansion.

The temperature immediately prior to expansion of the mixture is also important if high laser powers are to be produced by this method. For example, optimum temperature for mixtures conforming to Table I depends on the pressure, composition and nozzle design and may be in the region 1,200°K to 2400°K, whereas the exit temperature from a gas turbine combustor may be about 1,200° to 1,600°K.

A consideration of the above statement and Table I will make apparent the necessity for some adjustment of the composition and/or temperature of the gases bled from the combustion section of a gas turbine engine. This may be accomplished, for example, by burning extra fuel with the combustion chamber products, thus raising their "equivalence ratio." The equivalence ratio is defined as $$\frac{\text{FUEL TO AIR RATIO OF MIXTURE}}{\text{FUEL TO AIR RATIO OF STOICHIOMETRIC MIXTURE}}$$

Examples of laser action possible from the expansion of combustion products at equivalence ratios in the general range 0.4 – 0.8 are given in Table II following. As noted above, it is necessary that these equivalence ratios are in general higher than is usual in normal aero-engine practice.

It will be appreciated that a larger range of conditions than shown in Table II are possible and that the exact conditions of pressure and temperature chosen will depend on engineering considerations such as the availability of bleed gases and the maximum temperature that the nozzles will bear. In each case the nozzle is optimised for maximum gain and power.

The examples given in Table II are concerned with the burning of fuel in the bleed gases, since it is convenient, technically speaking, to use. However, it is conceived that other substances (such as carbon dioxide) could be added at 9 to give mixtures capable of improved laser action.

Examples of fuels and substances which could be used are aviation kerosene, various other hydrocarbon fuels, nitrogen, carbon disulphide, carbon dioxide, carbon monoxide, air, cyanogen and finely divided carbon.

Having attained a suitable mixture in reservoir/combustion chamber 8, the gases are passed through convergent-divergent nozzles 10, which are of such proportions as to produce supersonic flow at the throats and in the divergent portion of the nozzles. The nozzles are "choked." Although only one nozzle is shown in FIG. 1 for reasons of simplicity and clarity, there is a multiplicity of nozzles arranged as shown in FIG. 3, which is a cross-section of z nozzle arrangement as might be seen on section lines III—III in FIGS. 1 and 2.

The nozzles may be of the type commonly known as "slot" nozzles or "2-D" (2-dimensional) nozzles and are arranged in this manner so that a sufficiently long optical path may be provided in optical cavity C.

Alternatively they may be axi-symmetric nozzles, which allow faster rates of expansion, providing that

TABLE II

| | | | |
|---|---|---|---|
| Equivalence ratio | 0.38 | 0.59 | 0.85 |
| Reservoir Pressure (Atmospheres) | 16 | 16 | 16 |
| Stagnation (Total) Temperature | 1600 | 2000 | 2400 |
| Molar % $N_2$ | 76 | 75 | 73 |
| $CO_2$ | 5 | 8.1 | 11 |
| $H_2O$ | 5 | 7.7 | 11 |
| $O_2$ | 12 | 7.9 | 2.5 |
| Small signal gain* (% cm) | 0.78 | 1.03 | 0.83 |
| Area expansion ratio for minimum length contoured 2D nozzle, throat height 0.2mm | 55 | 55 | 55 |
| Ideal power KW/Kg of flow (without losses) | 33 | 44 | 48 |

*"Small signal gain" is a measure of the amplification per unit length of a beam of radiation at the laser output wavelength which does not appreciably disturb the lasing medium.

the flow from the array is sufficiently uniform. Such nozzles are subject to high stagnation temperature and pressure and may require cooling, for example by passing coolant liquid or gas through channels within the nozzle array, or by introducing a film of cool gas over the surface of the nozzles.

Figure 4:
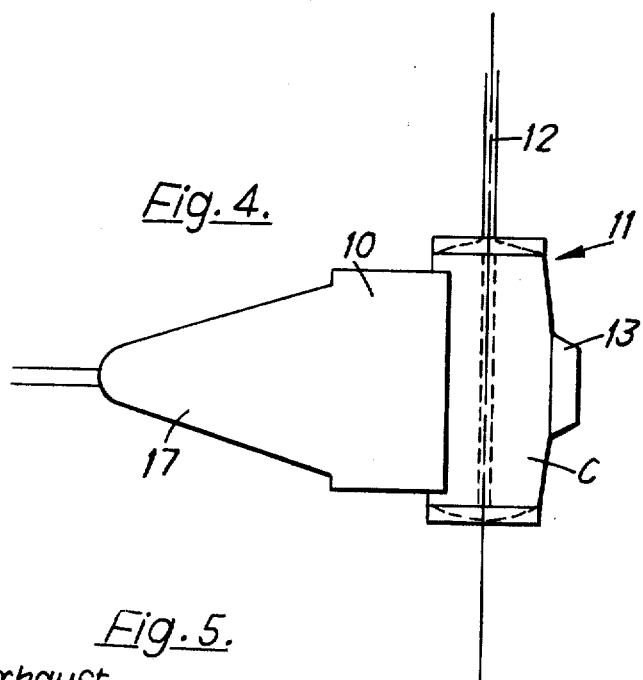
FIG. 4 shows the position of the optical cavity in relation to the nozzles, and is a view such as might be seen on arrow IV in FIG. 2.
Figure 5:
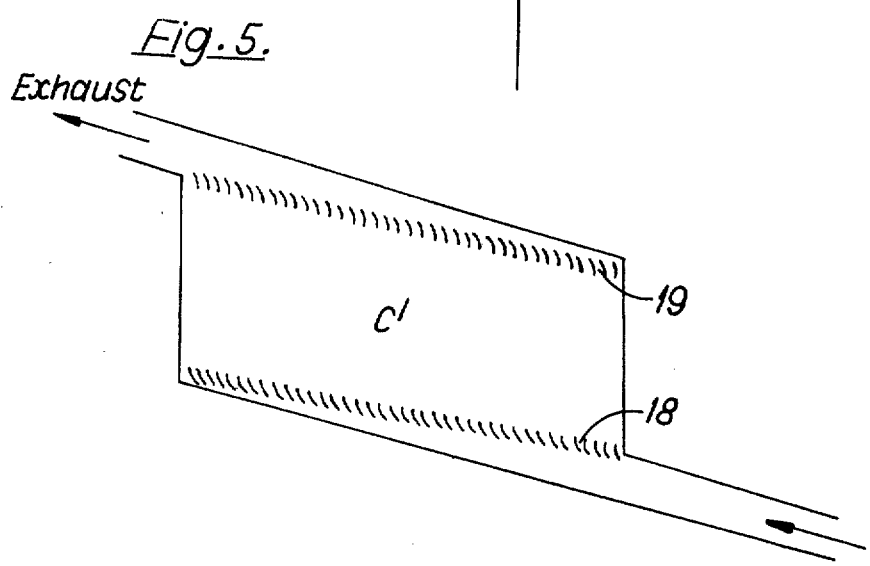
FIG. 5 is a purely schematic representation of one alternative method of arranging the optical cavity in conjunction with expansion and diffusion nozzles.

It may reduce the size of the device if the flow in the subsonic portion of the nozzle is turned so that the outlet flow is at an angle to the inlet. In FIG. 5, not only is the flow turned through an angle in the expansion nozzle portion 18 of the device, but the diffuser portion 19 is similarly designed. The configuration is that of a double supersonic turning nozzle, the lasing cavity C' being interposed between the two sets of nozzles. It will be noticed that this configuration eliminates the flared portion of the reservoir/ combustion chamber 8, seen best in FIG. 4, which is otherwise necessary in order to adapt the output of the chamber to the nozzle section 10.

As indicated in FIG. 5, nozzles 18, 19 may be produced by an array of aerodynamically-shaped guide vanes such as are used, for example, in gas turbine engines. Arrays of guide vanes could also be used in the embodiments according the FIGS. 1 and 2, though in this case they would not be required to perform the function of turning the gases through an angle into and out of the lasing cavity. Such vanes could be internally cooled for operation at high temperatures.

Returning to FIGS. 1 to 4, optical cavity C in expansion chamber 11 provides "resonance," i.e., any laser radiation resulting from the population inversion is reflected backwards and forwards along the optical path by means of suitably shaped mirrors situated at both ends of cavity C, thereby stimulating further laser emission. The optical path is thus disposed transversely of the gas flow through the nozzles and parallel to the row of nozzles, as is shown in FIG. 4, which is a view such as might be seen on arrow IV in FIG. 2.

Assuming that the optical cavity C is correctly constructed, aligned and positioned, a laser beam 12 will result when conditions in the gas stream conform to requirements as previously stated.

After passing through optical cavity C and expanding to its full extent in expansion chamber 11, its pressure will be of a low value and, unless the aeroplane is operating at high altitude, the pressure in chamber 11 will probably be lower than atmospheric pressure or pressure in the jet pipe. Since the exhaust gases must be removed from the apparatus (preferably to the jet pipe in order to augment engine thrust), it is necessary to provide a compressor 13 as well as exhaust duct 14. Thus, if required, compressor 13 may compress exhaust gases to an appropriate value and expel them to atmosphere or to the jet pipe 5 through duct 14, at the same time maintaining a sufficiently low pressure in expansion chamber 11.

Compressor 13 may be powered as an accessory of the gas turbine engine.

Alternatively, a diffuser unit may be used in place of compressor 13 to exhaust the gases from the chamber 11.

Referring now to FIG. 2, this FIG. shows diagrammatically a second embodiment of the invention. Again, a gas turbine engine 1 as already described is used to supply bleed gases, but in this version they are taken from the high pressure compressor H.P.2 of the compressor 2 of the engine. In order to produce a gas stream of the required temperature, pressure and composition, it is necessary to inject a fuel into the bleed gases at 15, and possibly other substances at 16 in addition.

Suitable fuels would be, for example, benzene, kerosene, acetylene, or ethylene i.e., hydrocarbon fuels generally. Reactive additives could be cyanogen or carbon monoxide, for example, which could be classed as fuels. A non-reactive additive could be nitrogen or or $CO_2$. Examples are shown in table IV of kereosene/air combustion and also combustion of benzene with non-reactive additives which will produce laser action.

TABLE IV

| Proportion of Air from Compressor | Mass-flow of fuel and additives for equivalence ratio 0.6. (Kg/sec) |
|---|---|
| 0.963 | 0.037 Kerosene |
|  | No additives |
|  | 0.028 ($C_6H_6$) Benzene |
| 0.396 | 0.49 $N_2$ Additives |
|  | 0.09 $CO_2$ |

After combustion and mixing in combustion chamber 17, the mixture is passed on to nozzles 10, expansion chamber 11 containing optical cavity C where laser beam 12 is produced, and is then exhausted to atmosphere or to jet pipe 5 through compressor 13 (or a diffuser) and duct 14. Thus, the part of the present embodiment downstream of the combustion chamber 17 is substantially the same as that of the first embodiment already described; no further description is therefore needed.

Using apparatus similar to that described in the present specification, it is thought possible to produce a laser beam of sufficient power to be useful in an offensive or defensive role.

Modern gas turbines are capable of delivering mass flows in excess of 25 Kg/sec of which 10 percent may easily be bled off. Of the total energy contained in the bleed gas, about 40 KW/Kg/Sec may be potentially available for laser action using carbon dioxide as the lasing species. If, in such a device, one quarter to one half of the potential laser power is realised, then 10 to 20 KW/Kg/sec will be obtained; for the example given above this is a total of 25 to 50 KW.

We claim:

1. A method of producing a laser beam, comprising diverting gases from their normal flow path through a continuous combustion engine into an auxiliary flow path, injecting into said diverted gases at least one additional substance to produce a gaseous mixture having a composition suitable for the support of lasing therein, aerodynamically expanding said gases supersonically to produce an energy population inversion in a lasing species of the mixture, and stimulating the production of said laser beam in an optically resonant cavity, said continuous combustion engine being a gas turbine engine.

2. A method according to claim 1 in which the diverted gases are combustion gases from the gas turbine engine.

3. A method according to claim 2 further comprising passing said combustion gases into a reservoir/mixing chamber, and injecting at least one additional substance therein to produce a gaseous mixture having a composition suitable for lasing to occur therein.

4. A method according to claim 3 in which the at least one additional substance is at least one fuel, said fuel being injected into the reservoir/mixing chamber, and further comprising the step of burning said fuel in said reservoir/mixing chamber, said at least one fuel being selected from the group comprising benzene, Kerosene, acetylene, ethylene carbon monoxide and cyanogen.

5. A method according to claim 4 further comprising the step of injecting additional substances into the reservoir/mixing chamber, said further additional substances being selected from the group comprising carbon dioxide, carbon disulphide, nitrogen air and finely divided carbon.

6. A method according to claim 1 in which the diverted gases are drawn from the compressor section of the gas turbine engine.

7. A method according to claim 6 further comprising the steps of passing said gases taken from said compressor to a combustion chamber, injecting at least a hydrocarbon fuel therein to produce a gaseous mixture capable of supporting laser action, and burning said gases in said combustion chamber.

8. A method according to claim 7 further comprising the step of injecting one or more further substances into the combustion chamber, said further substances being selected from the group comprising air, nitrogen, carbon dioxide, carbon monoxide, carbon disulphide and cyanogen.

9. A method according to claim 7 further comprising the step of aerodynamically expanding said gaseous mixture after combustion through an array of expansion nozzles into and through the optically resonant cavity, said gaseous mixture being then exhausted from the apparatus.

10. A method according to claim 1 in which the additional substances injected into the dinerted gases are selected from the group comprising benzene, Kerosene, acetylene, ethylene, carbon monoxide, carbon dioxide, nitrogen, air, carbon disulphide, cyanogen and finely divided carbon.

11. A method according to claim 1 in which, after passing the gases through the optically resonant cavity, the step of compressing the gases to the pressure prevailing in the gas turbine exhaust duct and exhausting said gases thereto.

12. A method according to claim 1 in which, after passing the gases through the optically resonant cavity, the step of exhausting the gases to atmosphere after compression to ambient pressure.

13. Apparatus for producing a laser beam, comprising in flow sequence
a continuous combustion gas turbine engine,
means for diverting gases from their normal flow path through said engine into an auxiliary flow path,
means for injecting into said gases at least one additional substance to produce a gaseous mixture having a composition suitable for the support of lasing therein,
means for aerodynamically expanding said gaseous mixture supersonically to produce an energy population inversion in a lasing species of said mixture,
an optically resonant cavity adapted to stimulate the production of said laser beam,
and means whereby said gaseous mixture is exhausted from the region of optical activity.

14. Apparatus according to claim 12 in which the gases taken from the engine are combustion gases of said engine.

15. Apparatus according to claim 14 provided with a reservoir/mixing chamber for receiving the combustion gases, and having means for injecting at least one additional substance into said chamber to produce a gaseous mixture having a composition suitable for lasing to occur therein.

16. Apparatus according to claim 15 in which the reservoir/mixing chamber is adapted to be a combustion chamber for the burning of at least one additional fuel therein, said at least one additional fuel being selected from the group comprising hydrocarbon fuels, carbon monoxide and cyanogen.

17. Apparatus according to claim 16 having means for injecting further additional substances into said chamber, said additional substances being selected from the group comprising carbon dioxide, carbon disulphide, nitrogen, air and finely divided carbon.

18. Apparatus according to claim 15 in which additional substances to be injected into the reservoir/mixing chamber are selected from the group comprising carbon dioxide, carbon disulphide, nitrogen, air and finely divided carbon.

19. Apparatus according to claim 3 in which the gases are taken from the compressor section of the gas turbine engine.

20. Apparatus according to claim 19 further including a combustion chamber for receiving the gases taken from the compressor of the engine, said combustion chamber including means for injecting and burning at least a hydrocarbon fuel therein to produce a gaseous mixture having a composition suitable for lasing to occur therein.

21. Apparatus according to claim 20 having means for injecting further substances into the combustion chamber, said further substances being selected from the group comprising air, nitrogen, carbon dioxide, carbon monoxide, carbon disulphide and cyanogen.

22. Apparatus according to claim 13 in which said means for aerodynamically expanding the gaseous mixture comprises at least one row of convergent-divergent supersonic expansion nozzles.

23. Apparatus according to claim 22 in which the expansion nozzles comprise a plurality of spaced-apart aerodynamically shaped vanes arranged in at least one row.

24. Apparatus according to claim 13 in which said means for aerodynamically expanding the gaseous mixture comprises at least one row of aerodynamically shaped vanes forming a supersonic turning nozzle adapted to both supersonically expand the gaseous mixture and change its direction of flow before its entry into the region of optical activity.

25. Apparatus according to claim 13 in which said means whereby the gaseous mixture is exhausted from the region of optical activity comprises a diffuser, said diffuser being adapted to pass gases to the exhaust duct of the gas turbine engine.

26. Apparatus according to claim 25 in which the diffuser is adapted to pass gases direct to atmosphere.

27. Apparatus according to claim 13 in which said means whereby the gaseous mixture is exhausted from the region of optical activity comprises at least a compressor means for removing said mixture from said region of optical activity and for compressing and passing said mixture to a duct means.

28. Apparatus according to claim 27 in which the duct means is adapted to pass the exhaust gases to the exhaust section of the gas turbine engine.

29. Apparatus according to claim 27 in which the duct means is adapted to pass the exhaust gases to the atmosphere.

30. A method according to claim 3 in which the additional substances to be injected into the reservoir/mixing chamber are selected from the group comprising carbon dioxide, carbon disulphide, nitrogen, air, and finely divided carbon.

* * * * *